US008058349B2

(12) United States Patent
Montoya-Goni et al.

(10) Patent No.: US 8,058,349 B2
(45) Date of Patent: Nov. 15, 2011

(54) MICROWAVE HEATABLE MONOVINYL AROMATIC POLYMERS

(75) Inventors: Amaia Montoya-Goni, Bergen op Zoom (NL); Ronald G. Van Daele, Belsele (BE); Roel Vossen, Hulst (NL); Michael Cook, Horgen (CH)

(73) Assignee: Styron Europe GmbH, Horgen (CH)

( * ) Notice: Subject to any disclaimer, the term of this patent is extended or adjusted under 35 U.S.C. 154(b) by 63 days.

(21) Appl. No.: 12/742,264

(22) PCT Filed: Nov. 14, 2008

(86) PCT No.: PCT/US2008/083578
§ 371 (c)(1),
(2), (4) Date: May 11, 2010

(87) PCT Pub. No.: WO2009/070458
PCT Pub. Date: Jun. 4, 2009

(65) Prior Publication Data
US 2010/0273950 A1  Oct. 28, 2010

Related U.S. Application Data

(60) Provisional application No. 60/991,178, filed on Nov. 29, 2007.

(51) Int. Cl.
| | |
|---|---|
| *C08F 8/00* | (2006.01) |
| *C08L 9/00* | (2006.01) |
| *C08L 23/00* | (2006.01) |
| *C08L 25/02* | (2006.01) |
| *C08L 41/00* | (2006.01) |

(52) U.S. Cl. ........ 525/191; 525/208; 525/232; 525/240; 525/241; 522/113; 522/126

(58) Field of Classification Search ............... 525/191, 525/208, 232, 240, 241; 522/113, 126
See application file for complete search history.

(56) References Cited

U.S. PATENT DOCUMENTS

| | | |
|---|---|---|
| 2,890,194 A | 6/1959 | Phillips et al. |
| 3,018,262 A | 1/1962 | Schroeder et al. |
| 4,070,416 A | 1/1978 | Narahara et al. |
| 4,637,956 A | 1/1987 | Das et al. |
| 4,746,754 A | 5/1988 | Otterbacher et al. |
| 4,767,829 A | 8/1988 | Kordomenos et al. |
| 4,870,141 A | 9/1989 | Kordomenos |
| 4,976,833 A | 12/1990 | Debroy et al. |
| 5,108,458 A | 4/1992 | Marumoto et al. |
| 5,112,932 A | 5/1992 | Koenig et al. |
| 5,374,668 A | 12/1994 | Kanemura et al. |
| 5,405,688 A | 4/1995 | Decker et al. |
| 5,453,536 A | 9/1995 | Dai et al. |
| 5,559,064 A | 9/1996 | Tsuchinari et al. |
| 5,597,782 A * | 1/1997 | Henty ............... 505/480 |
| 6,153,719 A | 11/2000 | Abbey et al. |
| 6,242,083 B1 | 6/2001 | McGrail et al. |
| 6,288,176 B1 | 9/2001 | Hsieh et al. |
| 6,572,971 B2 | 6/2003 | Martin |
| 6,632,893 B2 | 10/2003 | Konarski et al. |
| 7,037,958 B1 | 5/2006 | Hansen et al. |
| 7,157,527 B2 | 1/2007 | Kuntimaddi et al. |
| 7,163,973 B2 | 1/2007 | Ahsan |
| 2002/0028932 A1 | 3/2002 | Loontjens et al. |
| 2003/0004282 A1 | 1/2003 | Kamikado et al. |
| 2003/0194635 A1 | 10/2003 | Mulligan |
| 2003/0224082 A1 | 12/2003 | Akopyan |
| 2004/0236021 A1 | 11/2004 | Faecke et al. |
| 2005/0053775 A1* | 3/2005 | Mino ............... 428/212 |
| 2005/0171237 A1 | 8/2005 | Patel et al. |
| 2005/0184434 A1 | 8/2005 | Akopyan |
| 2005/0187314 A1 | 8/2005 | Anderson et al. |
| 2006/0122357 A1 | 6/2006 | Faecke et al. |
| 2006/0148391 A1 | 7/2006 | Ono et al. |
| 2006/0281854 A1 | 12/2006 | Imamura et al. |
| 2006/0293172 A1 | 12/2006 | Rubinsztajn et al. |
| 2007/0009750 A1 | 1/2007 | Ito et al. |
| 2007/0023288 A1 | 2/2007 | Kuwano et al. |

FOREIGN PATENT DOCUMENTS

| | | |
|---|---|---|
| EP | 0 478 606 A1 | 4/1992 |
| EP | 915118 A1 | 5/1999 |
| EP | 1 459 871 A2 | 9/2004 |
| WO | 90/01589 A1 | 2/1990 |
| WO | 00/15690 A1 | 3/2000 |

OTHER PUBLICATIONS

International Search Report from PCT/US2008/083578 dated Jan. 30, 2009 (3 pages).
Written Opinion from PCT/US2008/083578 dated Jan. 30, 2009 (7 pages).
Manson, J.A. et al.; "Polymer Blends and Composites"; Plenum Press; New York; pp. 77-87 (11 pages).

* cited by examiner

*Primary Examiner* — Nathan M Nutter
(74) *Attorney, Agent, or Firm* — Brinks Hofer Gilson & Lione

(57) ABSTRACT

A method for melt-processing a polymer of a monovinyl aromatic compound, such as styrene, is disclosed. The method may include heating a polymer of a monovinyl aromatic compound volumetrically with microwave energy, wherein the polymer of a monovinyl aromatic compound includes: a discontinuous rubber phase; and a continuous poly(monovinyl aromatic) phase comprising up to 49 weight percent of at least one of an acrylate comonomer and a vinyl cyanide comonomer.

20 Claims, 2 Drawing Sheets

MICROWAVE HEATABLE MONOVINYL AROMATIC POLYMERS

BACKGROUND OF DISCLOSURE

1. Field of the Disclosure

Embodiments disclosed herein relate generally to the melt processing of polymers of monovinyl aromatic compounds and rubber modified polymers of monovinyl aromatic compounds. In a more specific aspect, embodiments disclosed herein relate to the melt processing of microwave-heatable high impact polystyrene compositions.

2. Background

Polystyrene is one of the largest volume thermoplastic resins in commercial production today. Unmodified polystyrene is well suited to applications where its brittleness is acceptable. Engineering plastics have been used in applications where impact resistance is required, but such polymers are often expensive or have properties other than impact resistance that make them less than optimum selections. Thus, styrene-based copolymers, and particularly polystyrene resins that are modified with rubber particles, have been investigated for use in applications requiring less brittleness. The modification of polystyrene to reduce brittleness is often referred to increasing its impact properties and thus the modified polystyrene is said to have higher impact.

These high-impact polystyrene resins, commonly referred to by the acronym HIPS, are known to be useful in the art of preparing articles with polymers wherein the application for the articles requires less brittleness than unmodified polystyrene. For example, U.S. Defensive Publication T59,011 to Smith discloses that a high impact resin can be prepared by blending from 15 to 50 parts of an impact modifier with from 85 to 50 parts of a clear crystal polystyrene. Such materials are disclosed to be useful for packaging applications.

Another method of making HIPS is to first dissolve a rubber in styrene monomer and then polymerize the monomer. Such polymers are disclosed in U.S. Pat. No. 6,569,941 to Sosa, et al. Therein, it is disclosed that styrene monomer containing a dissolved polybutadiene rubber is flowed into an elongated upflow stirred reactor containing three reaction zones, wherein the styrene monomer is polymerized to form a HIPS.

In HIPS, desirably the polystyrene is a continuous phase including a discontinuous phase of rubber particles. The size and distribution of the rubber particles in the continuous polystyrene phase can affect the properties of the HIPS. In blends of polystyrene with other materials, the distribution of the non-continuous phase in the continuous polystyrene phase is often similarly important.

Excessive heat history introduced to a HIPS composition may result in additional crosslinking of the rubber phase. Heat history may be introduced, for example, through devolatilization of the HIPS during manufacture, compounding, extrusion, or other processing of the HIPS at elevated temperatures. The resulting crosslinking of the discontinuous rubber phase may result in embrittlement of the rubber and a corresponding decrease in the impact strength of the polymer.

JP 2001-191461 discloses a rubber modified styrenic polymer obtained by polymerizing a monomer mixture based on a styrenic monomer and a methacrylic ester monomer in the presence of a rubbery elastomer. The composition may be used to prepare heat-shrinkable multilayer plastic films having good transparency and impact resistance. U.S. Pat. No. 4,782,127, which is incorporated herein by reference, discloses the use of an ester of acrylic acid, such as n-butyl acrylate, to improve melt flow properties of polystyrene.

As disclosed in PCT Application Nos. PCT/US2007/012821, PCT/US2007/012822, and PCT/US2007/012817, and U.S. Provisional Patent Application Ser. No. 60/932,790, each of which are incorporated herein by reference, microwave heating of polymers may reduce cycle times, volumetric heating with microwaves may eliminate the need for "surface" or "contact" heating, and therefore may eliminate the potentially deleterious effects of high polymer surface temperatures, such as discoloration, surface defects, and gloss gradients, among others. Volumetric heating may also eliminate the undesirable temperature gradient through a sheet thickness, such as may typically result from radiant heating of a polystyrene sheet during a thermoforming process.

Unfortunately, polystyrene and high impact polystyrene are not receptive to microwave heating, as they do not have any functional groups that will absorb microwave energy (i.e., polystyrene is transparent to microwaves). Microwave-receptive additives, such as a zeolite or water, may be used to make a polystyrene matrix susceptible to microwaves; however, this requires an additional compounding step, adding undesired heat history to the rubber phase, and these compounds may affect the clarity and mechanical properties of the HIPS. These compounding additives may be expensive, and the compounding of the same additionally increases the cost of the resulting polystyrene.

Accordingly, there exists a need for high impact polystyrenes that may be processed using microwave heating apparatus.

SUMMARY OF THE DISCLOSURE

In one aspect, embodiments disclosed herein relate to a method for melt-processing a polymer of a monovinyl aromatic compound. The method may include heating a polymer of a monovinyl aromatic compound volumetrically with microwave energy, wherein the polymer of a monovinyl aromatic compound includes: a discontinuous rubber phase; and a continuous poly(monovinyl aromatic) phase comprising up to 49 weight percent of at least one of an acrylate comonomer and a vinyl cyanide comonomer.

In another aspect, embodiments disclosed herein relate to a method for melt-processing a high impact polystyrene. The method may include heating a high impact polystyrene volumetrically with microwave energy, wherein the high impact polystyrene includes: a discontinuous rubber phase; and a continuous styrene phase comprising up to 49 weight percent of at least one of an acrylate comonomer and a vinyl cyanide comonomer.

In another aspect, embodiments disclosed herein relate to a method for manufacturing an article. The method may include A) heating a high impact polystyrene volumetrically with microwave energy, wherein the high impact polystyrene comprises: a discontinuous rubber phase; and a continuous styrene phase comprising up to 49 weight percent of at least one of an acrylate comonomer and a vinyl cyanide comonomer; and B) processing the heated high impact polystyrene to form the article.

In another aspect, embodiments disclosed herein relate to a method for manufacturing an article, the method including: disposing a high impact polystyrene as a layer in a multi-layered composite having one or more layers non-receptive to microwave energy, wherein the high impact polystyrene includes: a discontinuous rubber phase; and a continuous styrene phase comprising up to 49 weight percent of at least one of an acrylate comonomer and a vinyl cyanide comonomer; heating the high impact polystyrene volumetrically with microwave energy; and processing the composite to form the article.

Other aspects and advantages will be apparent from the following description and the appended claims.

DETAILED DESCRIPTION

Figure 1:
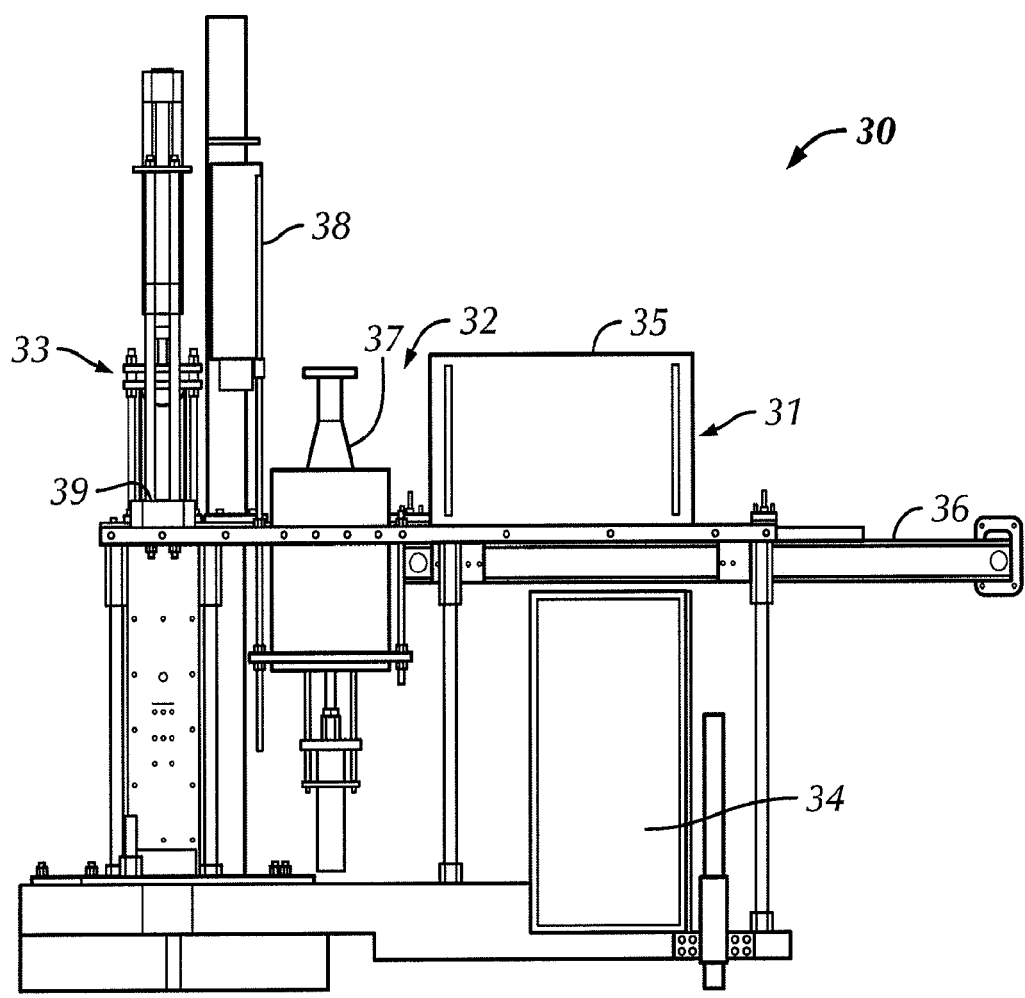
FIG. 1 illustrates an embodiment of a microwave heating device used in conjunction with a mold to form thermoformed parts.

In one aspect, embodiments disclosed herein relate to the melt processing of polymers of monovinyl aromatic compounds and rubber modified polymers of monovinyl aromatic compounds. In a more specific aspect, embodiments disclosed herein relate to the melt processing of high impact polystyrene compositions. More specifically, embodiments disclosed herein relate to the melt processing of high impact polystyrene, where the polymer is heated via microwave energy.

Other embodiments disclosed herein relate to the formation of polystyrene and high impact polystyrene compositions that are receptive to microwave energy. Microwave-heatable polystyrenes according to embodiments disclosed herein may be formed by co-polymerizing styrene with a microwave-receptive co-monomer. For example, styrene may be co-polymerized with acrylates and/or vinyl cyanides to form a microwave-heatable polystyrene composition. In other embodiments, styrene may be co-polymerized with an acrylate or vinyl cyanide co-monomer in the presence of an elastomer to form a microwave-heatable high impact polystyrene composition.

Compared to alternative methods of heating, such as radiant, convective, or contact heating, the use of microwave energy may result in very rapid, volumetric heating. The use of microwave energy may overcome two fundamental limitations of the conventional heating systems: the dependence on the thermal conductivity of the polymer to transport heat energy form the surface of the part; and the maximum allowable temperature of the polymer surface which in turn determines the maximum available temperature driving force. Additionally, with respect to rubber modified polystyrenes, the volumetric heating obtained via microwaves may decrease the heat history and crosslinking of the discontinuous rubber phase. Volumetric heating may thus allow a reduction in sheet heating time and sheet sagging, which may result in an increase in productivity and a reduction in reject rates.

Microwave heating devices useful in embodiments disclosed herein are disclosed in PCT Application Nos. PCT/US2007/012821, PCT/US2007/012822, and PCT/US2007/012817, and U.S. Provisional Patent Application Ser. No. 60/932,790, each of which are incorporated herein by reference, including microwave apparatus having multiple resonant cavities. Additionally disclosed therein are microwave heating devices operatively coupled to a melt processing apparatus, such as a thermoformer.

One such microwave heating and thermoforming apparatus is illustrated in FIG. 2. Thermoforming equipment 30 may include feed stage 31, heating stage 32, and forming stage 33, each of which may be controlled and or powered by wiring from an electrical cabinet 34, which may include PLCs or DCS connections. Polymer sheets or blanks 35 may be intermittently fed to heating stage 32 using a drive belt 36 to transport the polymer sheets or blanks 35. Once loaded into heating stage 32, microwave heating apparatus 37 may be used to expose polymer sheets or blanks 35 to microwave energy, where microwave heating apparatus 37 may include equipment as described above (microwave generators, tuners, horns, waveguides, etc.). Once heated, the polymer sheets or blanks 35 may be transported to thermoforming stage 33. During transport to thermoforming stage 33, an infrared camera 38 or other equipment may be used to monitor the temperature of polymer sheet 35, to insure that polymer sheet 35 is at the desired temperature or temperature profile, and may also be used to control microwave heating apparatus 37. Once loaded into thermoforming stage 33, polymer sheet 35 may be formed using mold 39, such that a desired shape or part is formed.

Figure 2A:
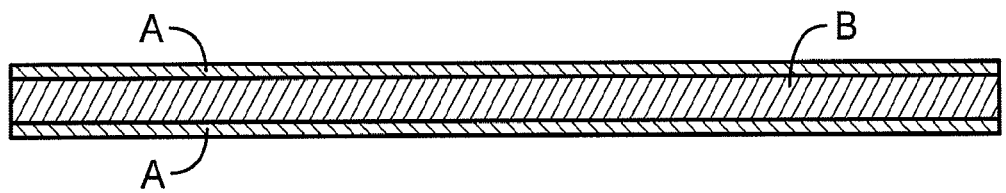
FIGS. 2A and 2B illustrate multi-layered sheets formed with at least one layer of the microwave-heatable monovinyl aromatic compounds disclosed herein.

As one example of sheet extrusion, a microwave sensitive layer may be incorporated into a multilayered sheet. For example, FIG. 2A illustrates one embodiment of a multilayered sheet incorporating a microwave sensitive layer. The microwave sensitive layer B may form a sheet core, bounded by outer layers A not sensitive to microwave heating. Incorporation of a microwave sensitive core layer may facilitate subsequent processing of the sheet, such as during sheet thermoforming. In some embodiments, sheet thermoforming may be facilitated by use of a microwave selective polymer by enabling thick sheet thermoforming, selective drawability, and rapid, uniform heating of the sheet.

Figure 2B:
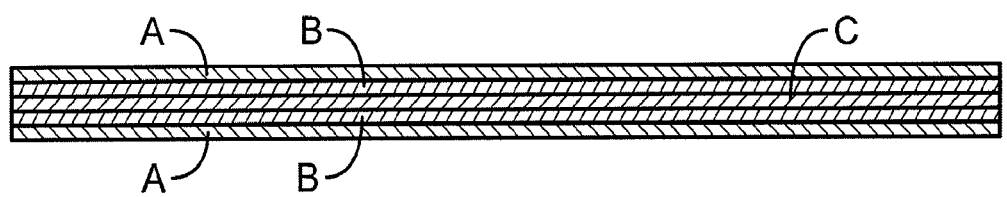

Although illustrated in FIG. 2A as a three layered sheet, in other embodiments a microwave sensitive polymer may form a region or regions within a polymer structure. For example, the microwave sensitive polymer may form a discrete layer in a sheet having two or more layers. In other embodiments, the microwave sensitive polymer may form specific regions of a larger structure, allowing selective heating of those regions for further processing. In yet other embodiments, the microwave sensitive polymer may form one side of a side-by-side fiber structure. In yet other embodiments, the microwave sensitive polymer may form the core or the sheath of a core/sheath fiber structure. As illustrated in FIG. 2B, various layers of microwave heatable compositions, which may have similar or different microwave receptive properties, may form a multi-layered sheet to provide desired heating characteristics. As illustrated, layers A and C may be non-receptive to microwaves while the B layers are receptive to microwaves. In other embodiments, to achieve desired heating characteristics, layers A and C may be receptive to microwaves while the B layers are not receptive to microwaves.

Microwave heating may be used, for example, to heat sheets, multi-layered sheets, pre-cut sheets, blanks, molded blanks, or pucks, such as may be used appropriately in thermoforming, injection molding, and compression molding processes. In some embodiments, the sheets, multi-layered sheets, blanks, molded blanks, or pucks formed with microwave-heatable polymers may have a thicknesses ranging up to 30 cm, 50 cm, or more, in some embodiments; from 0.01 mm to 10 cm in other embodiments; from 0.1 mm to 7.5 cm in other embodiments; and from 0.25 cm to 5 cm in yet other embodiments. In some embodiments, microwave-heatable polystyrene compositions disclosed herein may be used in expanded polystyrene applications, having thicknesses ranging up to 30 cm, 50 cm, or more. In other embodiments, such as for "thick-sheet" applications, the sheets may have a thickness up to 15 cm; up to 10 cm in other embodiments; up to 5 cm in other embodiments; and up to 2.5 cm in yet other embodiments. Sheets processed in embodiments disclosed herein may have a width of 10 feet or more; 8 feet or more in other embodiments; 6 feet or more in other embodiments; 4 feet or more in other embodiments; and 2 feet or more in yet other embodiments. The aspect ratio of sheet that may be processed may range from 1 to 5000 in some embodiments, where the aspect ratio is defined as average width divided by average thickness. In other embodiments, the aspect ratio may range from 10 to 2500; from 50 to 1000 in other embodiments; and from 100 to 500 in yet other embodiments.

For the above described thicknesses, widths, and aspect ratios, the length of the heated material may be any desired length. Length may depend, for example, on whether the downstream processes are configured to process a continuous sheet, such as from a roll, or configured to process a material of finite length, such as pre-cut sheets, blanks, molded blanks, or pucks. Accordingly, length may vary from a few centimeters to an infinite length.

As discussed above, polystyrenes are generally transparent to microwave energy. As disclosed herein, polystyrene and high impact polystyrene may be modified such that the continuous polystyrene phase is heatable via microwave energy. The resulting microwave-receptive polystyrene may then be heated using microwave energy, in lieu of or in combination with radiant, convective, or contact heating. The heated polystyrene may then be processed, such as mixed, transferred, shaped, stamped, injected, formed, molded, extruded or otherwise used in a primary conversion process or a secondary fabrication process to form articles.

Microwave-heatable compositions disclosed herein may include thermoplastic compositions containing a polymer of a monovinyl aromatic compound which has been modified with an elastomer or rubber. These thermoplastic compositions may be obtained by polymerizing a monovinyl aromatic compound in the presence of an acrylate or vinyl cyanide comonomer, one or more polymerization initiators, and the elastomer.

The high impact polymers may be manufactured in accordance with any conventional process, provided the constituents mentioned hereinabove are utilized. Normal manufacturing processes include mass polymerization and solution polymerization such as that disclosed in U.S. Pat. No. 2,694,692 or mass suspension polymerization such as that disclosed in U.S. Pat. No. 2,862,906. Other processes of manufacture may also be used, provided the processes are capable of utilizing the constituents mentioned hereinabove, including conventional method such as suspension polymerization, emulsion polymerization, bulk polymerization, and solution polymerization. Also with respect to the type of reaction, any one of radical polymerization, anionic polymerization and cationic polymerization may be employed.

Microwave-heatable high impact polystyrene (MW-HIPS) manufactured according to embodiments disclosed herein may be formed by polymerizing a monovinyl aromatic compound and an acrylate or vinyl cyanide comonomer in the presence of a rubber.

Monovinyl aromatic homopolymers and copolymers (individually and collectively referred to as "polymers" or "copolymers") are produced by polymerizing monovinyl aromatic monomers such as those described in U.S. Pat. Nos. 4,666,987, 4,572,819 and 4,585,825. The monovinyl aromatic monomers suitable for producing the polymers and copolymers used in the practice of this invention are preferably of the following formula:

in which R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl (in which the alkyl group of the phenyl ring contains 1 to 10, preferably 1 to 8 and more preferably 1 to 4, carbon atoms), with phenyl being most preferred. Typical monovinyl aromatic monomers which can be used include: styrene, alpha-methylstyrene, all isomers of vinyl toluene, especially para-vinyltoluene, all isomers of ethyl styrene, propyl styrene, vinyl biphenyl, vinyl naphthalene, vinyl anthracene and the like, and mixtures thereof with styrene being the most preferred. monovinyl aromatic. The monovinyl aromatic compounds may be employed singly or as mixtures. In one particular embodiment, the monovinyl aromatic compound is styrene.

The particular rubber utilized in the present invention could be one of several types, for example the type sold by Firestone and designated as Diene 55 having a Mooney viscosity of approximately 55, a number molecular weight of about 150,000, weight average molecular weight of about 300,000, and a Z molecular weight of about 500,000 as measured by the gel permeation technique. Another type of advantageous rubber material includes the high-Cis rubbers. Other rubber compounds that may be used include styrene-butadiene copolymers. The amount of rubber used in some embodiments may range from about 2 to about 25 percent by weight based on the total weight of the polymer; from about 3 to about 20 weight percent in other embodiments; and from about 4 to about 15 weight percent in yet other embodiments.

Acrylate comonomers may include methyl acrylate, ethyl acrylate, isobutyl acrylate, n-butyl acrylate, methyl(meth) acrylate, glycidyl analogs of the same, and other acrylates known in the art. Vinyl cyanide comonomers may include acrylonitrile and methacrylonitrile, among others known in the art. Such comonomers may be used in an amount up to about 49 weight percent in some embodiments; up to 25 weight percent in other embodiments; up to 15 weight percent in other embodiments; up to about 10 weight percent in other embodiments; and up to about 5 weight percent in yet other embodiments.

The polymerization may be carried out in a conventional manner by mass polymerization, solution polymerization, or polymerization in aqueous dispersion, the rubber first being dissolved in the polymerizable monomer and acrylate and/or vinyl cyanide comonomer and this solution then being subjected to polymerization in the presence of a suitable initiator or initiator combination. Although thermal (heat initiated) polymerization conditions are preferred, it is also possible to use low levels of a polymerization initiator selected from the known initiators including the peroxide initiators including the peresters, for example, tertiary butyl peroxybenzoate, tertiary butyl peroxyacetate, dibenzoyl peroxide, and dilauroyl peroxide, the perketals, for example, 1,1-bis tertiary butyl peroxycyclohexane, 1,1-bis tertiary butyl peroxy-3,3,5-trimethyl cyclohexane, and di-cumyl peroxide, and the percarbonates; and photo chemical initiation techniques. These initiators may be employed in a range of concentrations dependent on a variety of factors including the specific initiator employed, the desired levels of polymer grafting and the conditions at which the mass polymerization is conducted. If used, from about 50 to about 300, preferably from about 100 to about 200, weight parts of the initiator are employed per million weight parts of monomer. monovinyl aromatic.

Inert diluents that may be used during the polymerization process may include aromatic hydrocarbons or mixtures of aromatic hydrocarbons such as toluene, ethylbenzene, xylenes, or mixtures of these compounds. Suitable chain transfer agents, e.g., mercaptans or alphamethyl styrene dimer, may also be added to control polymer molecular weight and rubber particle size. Additionally, lubricants, such as mineral oil, olefinic synthetic oils, and polyisobutylene, may also be added.

An acrylate or vinyl cyanide modified polymer of a monovinyl aromatic compound may be heated via microwave energy. The efficient conversion of thermoplastic materials using electromagnetic energy may then be performed by heating at least a portion of the volume of the thermoplastic material, that portion being sufficient to render the material processable in a subsequent forming technique. As used herein, processable means the provision of sufficient melt-state or softening of at least a portion of the thermoplastic in order for the bulk plastic to be mixed, transferred, shaped, stamped, injected, extruded, etc., to form a product. The heating of the thermoplastic substrate may be achieved by the exposure of the thermoplastic to electromagnetic energy, such as microwaves, which have the ability to penetrate through the entire volume of the substrate and to be preferentially absorbed in microwave sensitive regions.

By applying microwave radiation, heat may be generated locally at a predetermined region of the volume, bulk, or part of the polymer specimen. Thus, the amount of energy applied may be carefully controlled and concentrated, as other regions may consist of non-absorbing materials which are transparent to the radiation used. For example, an acrylate-modified polystyrene matrix may be heated via microwave energy, and the rubber phase may be transparent to microwave energy. By focusing on materials that are receptive to microwaves, the energy used to generate a processable thermoplastic may be reduced, the cycle times shortened and the mechanical and other properties of the final material may be adapted and optimized for various requirements and applications.

In this manner, the electromagnetic energy interacts with the substrate or certain regions of the substrate, which will increase in temperature when electromagnetic energy is present. As the material is heated volumetrically, the material may be converted into a processable state more rapidly as compared to conventional heating techniques. Moreover, because that material may contain less heat energy than would normally be present had the entire bulk material been heated via surface conduction (infrared heating), there may be considerable savings in energy. For example, infrared heating results in significant energy losses to the atmosphere, and requires that the surface temperature of the part is significantly higher than the desired bulk temperature in order to effect an acceptable rate of heat transfer from the part surface to the part core and raise the core temperature to that required for processing. In contrast, microwave heating, which causes the temperature of the microwave sensitive polymer to heat rapidly and volumetrically to processing temperature, may result in a significantly lower polymer surface temperature. Microwave heating may also have less of a tendency for energy to be lost from the system, transferring energy primarily to where it is needed, i.e. the microwave-sensitive polymer. Microwave heating may also result in considerable savings in cycle time for a conversion process. The heating time may be reduced, not only because the microwave heating mechanism occurs rapidly throughout the bulk (in contrast to thermal conduction), but the total energy content of the part is less. The cooling cycle may also be reduced as the unheated regions of material effectively act as heat sinks to draw heat out of the neighboring heated regions, significantly enhancing the overall cooling rate of the bulk material. The rapid heating of polymeric sheet attainable via microwave heating, for example, may reduce sheet sagging, improving the thermoforming process and the thickness distribution of the formed part.

The microwave-heatable polymers disclosed herein may be used during a primary conversion or secondary fabrication processes. For example, in some embodiments, the microwave-heatable polymers may be used during the fabrication of polymeric articles including films, foams, profiles, compounded pellets, fibers, woven and non-woven fabrics, molded parts, composites, laminates, or other articles made from one or more polymeric materials. In other embodiments, the microwave-heatable polymers may be used in conversion processes such as sheet extrusion, co-extrusion, foam extrusion, injection molding, foam molding, blow molding, injection stretch blow molding, and thermoforming, among others.

Heating the bulk/continuous polystyrene phase via microwave energy, as described above, may result in conductive heating of the discontinuous rubber phase. The discontinuous rubber phase may act as a heat sink, helping reduce overall cycle times (especially cooling time).

Additionally, as the microwave-heating results in decreased surface temperatures as compared to conventional heating techniques, less heat history may be imparted to the rubber phase. Rubber feed percentages are typically adjusted to result in desired properties in a formed part, accounting for heat history imparted throughout the manufacturing cycle. As microwave heating may result in less heat history, and potentially less embrittlement of the rubber phase, it may be possible to use HIPS formulations having less rubber content, resulting in a final product having equivalent physical properties as compared to a product formed from a conventionally heated HIPS composition.

Applications

As described above, the microwave heating apparatus disclosed herein may be used to heat polymers for subsequent processing, such as being mixed, transferred, shaped, stamped, injected, formed, molded, extruded, or otherwise further processed. In some embodiments, microwave heating apparatus disclosed herein may be useful in thick sheet thermoforming processes, such as for forming refrigerator liners, for example. In other embodiments, microwave heating apparatus disclosed herein may be useful for heating, binding, or processing air laid binder fibers, for example. In other embodiments, microwave heating apparatus disclosed herein may be useful for blow molding processes, such as for the formation of blown bottles, for example.

In other embodiments, microwave heating apparatus disclosed herein may be useful in applications where the polymer being processed is not completely molten. For example, microwave heating apparatus may be used to selectively heat a select portion of the polymer passing through the apparatus, thereby concentrating the heat energy to only that portion being further processed, such as by a forming, molding, or stamping process. This may enhance the structural integrity of the material handled during processing, may reduce cycle times, and may reduce the energy required for processing the material into the desired shape.

In other embodiments, microwave heating apparatus disclosed herein may be useful in processing embossed sheets, including embossed sheet thermoforming. In conventional infrared thermoforming, heat input must pass through the surface of the sheet, and often reduces the retention of the embossing structure or surface details. In addition to the reduced heating cycles, as described above, microwave heating apparatus may allow for increased retention of embossing structures during processing due to the reduced energy footprint imparted to the sheet.

In other embodiments, selective heating may allow the use of microwave sensitive layers of polymer interspersed with non-sensitive layers. Microwave receptive additives and non-receptive polymers useful to form such layered materials are described in PCT Application Nos. PCT/US2007/012821, PCT/US2007/012822, and PCT/US2007/012817, and U.S. Provisional Patent Application Ser. No. 60/932,790, each of which are incorporated herein by reference. Layered polymers may provide for: optimum temperature profiling; the use of pulsed microwave energy during polymer processing; the selective placement of the microwave emitters providing for heating of specific regions of a part; and other manifestations which may provide for preferential or selective heating by virtue of the microwave sensitivity of one or more thermoplastic parts or layers.

EXAMPLES

The sample compositions are produced in a continuous process using three agitated reactors working in series. The rubber feed solution, ethyl benzene (EB), styrene and the remainder of the additives are supplied to the first reactor. The feed compositions are reported in Table 1 (styrene constitutes the balance of the feed). The composition of the final polymer is calculated based on the feed composition and conversion during polymerization.

TABLE 1

Sample Feed Compositions

| Feed Composition | Sample 1 | Sample 2 | Comparative Sample |
|---|---|---|---|
| % Rubber (BL 6533T) | 4.8 | 6.8 | 4.8 |
| % EB | 10 | 10 | 10 |
| % n-butyl acrylate | 5 | 5 | 0 |
| % Irganox 1076 | 0.1 | 0.1 | 0.1 |
| Chain Transfer Agent (ppm) | 100 | 100 | 80 |
| Mineral oil (%) | 0.5 | 0.5 | 2 |

The polymerization is continued until 80% solids is reached. Residual styrene and ethylbenzene diluent are flashed and the rubber crosslinked in a devolatilizing extruder. The samples are extruded through a die and roll stacked into the desired thickness sheet (1 mm).

Microwave Heating

Figure 3:
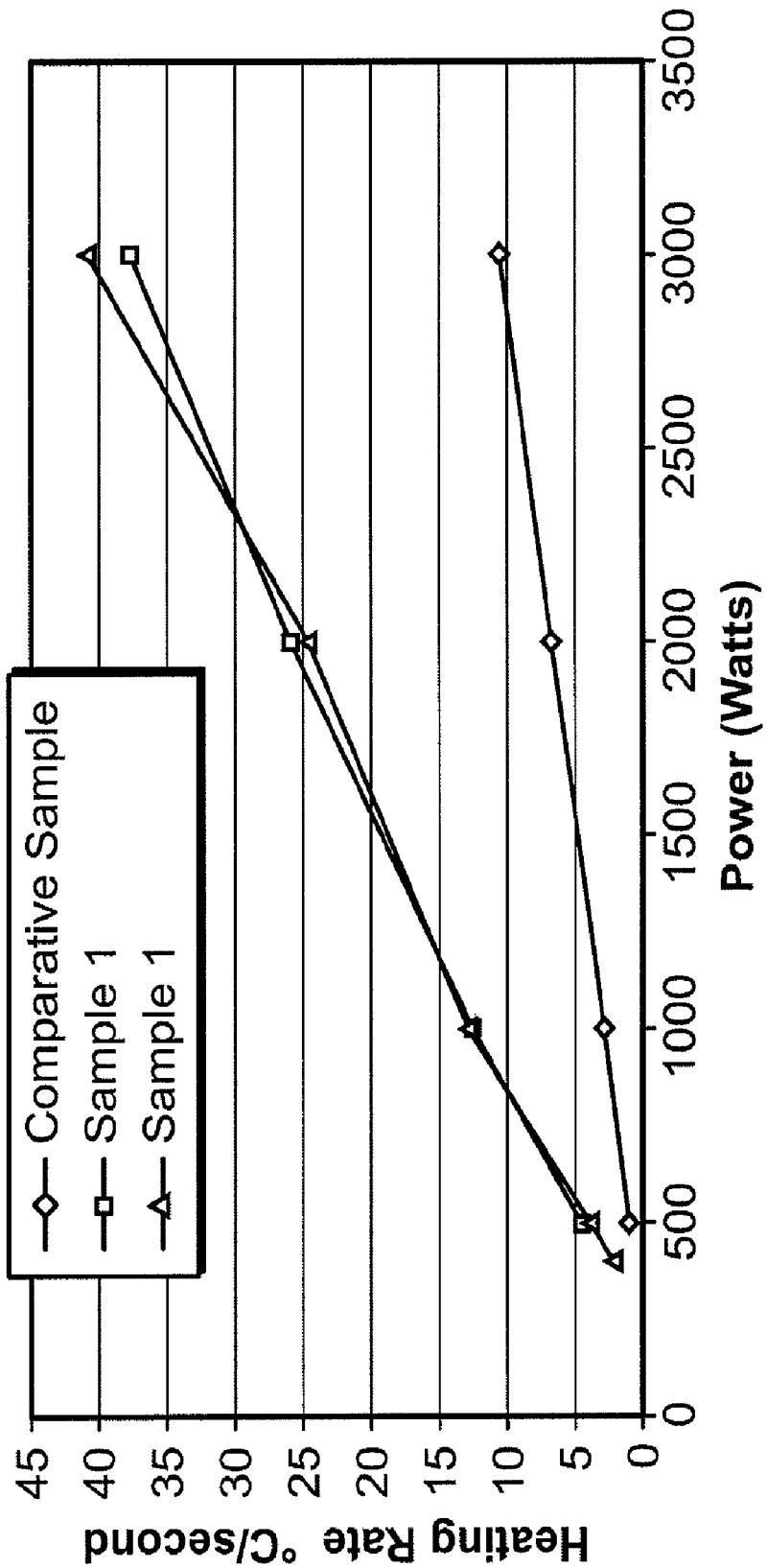
FIG. 3 is a graphical illustration of microwave heating of embodiments of the monovinyl aromatic compounds according to embodiments disclosed herein as compared to typical polystyrene.

Sheets formed from the Samples and Comparative Sample are heated using a microwave heating device similar to that of FIG. 1. Two manners of verifying heating rate are used to determine the microwave heating characteristics of the Samples and Comparative Sample: stationary and dynamic heating. For stationary heating, the sheet is placed inside the microwave unit, and the temperature rise of the sheet is observed through an IR temperature sensor. At each power setting, the heating rate is determined and set out as a function of applied power. Clearly, the heating rate of n-butyl acrylate modified HIPS is four times higher than unmodified HIPS, as illustrated in FIG. 3.

For dynamic heating, the sheets are fed to the microwave heating device at a rate of 10 mm/s, and the energy input to the microwave generator being 1200 Watts. The results of the dynamic microwave heating are given in Table 2.

TABLE 2

| | wt. % n-Butyl Acrylate Feed | Feeding Speed (mm/s) | Energy (W) | Temperature Reached (° C.) |
|---|---|---|---|---|
| Sample | 5 | 10 | 120 | 105 |
| Comparative Sample | 0 | 10 | 120 | 47 |

The heating of the high impact polystyrene with n-butyl acrylate comonomer resulted in a significant increase in the absorption of microwave energy, as shown by the difference in the temperature reached by the Sample as compared to the Comparative Sample. Accordingly, incorporation of minor amount of acrylate comonomers may be an effective means to impart microwave-sensitivity to high impact polystyrene.

Embodiments disclosed herein may provide for rapid, volumetric heating of a thermoplastic material. Embodiments may also provide for selective heating of discrete parts of a thermoplastic structure, such as individual layers in a laminated or co-extruded multilayer structure, for example. With regard to polymer processing, this technology may offer many advantages for designers and processors, including selective, rapid heating; reduced heating/cooling cycle times (high speed); high energy efficiency and other environmental benefits such as reduced emissions (as it is a dry and fumeless process) and increased recycling potential (through enabling the more widespread use of self-reinforced single material components); preservation of properties in self-reinforced parts (reduces risk of reversion); increased productivity; improved part quality and strength; and minimization of thermal degradation or crosslinking of the rubber phase in HIPS due to reduced residence time in a thermal process, and therefore thermal stabilization additives can be reduced in polymer formulation.

Advantageously, embodiments disclosed herein may provide reduced heating times, reducing overall fabrication cycle time, and improved part thickness distribution thus allowing the use of thinner sheet and hence reduced piece part cost. Embodiments disclosed herein may also provide reduced cooling times as a result of the use of selective heating, introducing "heat sinks" within a material that is being processed. Additionally, volumetric heating eliminates the need for "surface" or "contact" heating and therefore eliminates the potentially deleterious effects of high polymer surface temperatures. Volumetric heating also eliminates the undesirable temperature gradient through the sheet thickness. Embodiments disclosed herein may also advantageously provide improved productivity through reduced overall cycle times and reduced system energy requirements.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method for melt-processing a polymer of a monovinyl aromatic compound, the method comprising:
heating a polymer of a monovinyl aromatic compound volumetrically with microwave energy, wherein the polymer of a monovinyl aromatic compound comprises:
a discontinuous rubber phase; and
a continuous poly(monovinyl aromatic) phase comprising up to 49 weight percent of at least one of an acrylate comonomer and a vinyl cyanide comonomer.

2. The method of claim 1, wherein the monovinyl aromatic compound comprises at least one of styrene, alphamethylstyrene, ethylstyrene, vinyl benzene, and vinyl toluene.

3. The method of claim 1, wherein the discontinuous rubber phase comprises at least one of a butadiene rubber and a styrene-butadiene copolymer.

4. The method of claim 1, wherein the acrylate comonomer comprises at least one of methyl acrylate, ethyl acrylate, isobutyl acrylate, n-butyl acrylate, and methyl methacrylate.

5. The method of claim 1, wherein the vinyl cyanide comonomer comprises at least one of acrylonitrile and methacrylonitrile.

6. The method of claim 1, wherein the monovinyl aromatic compound comprises styrene and the acrylate comonomer comprises a butyl acrylate.

7. The method of claim 1, the polymer further comprising at least one of mineral oil and polyisobutylene.

8. The method of claim 1, further comprising disposing the polymer of a monovinyl aromatic compound as a layer in a multi-layered composite having one or more layers non-receptive to microwave energy.

9. A method for melt-processing a high impact polystyrene, the method comprising:
heating a high impact polystyrene volumetrically with microwave energy, wherein the high impact polystyrene comprises:
a discontinuous rubber phase; and
a continuous styrene phase comprising up to 49 weight percent of at least one of an acrylate comonomer and a vinyl cyanide comonomer.

10. The method of claim 9, wherein the discontinuous rubber phase comprises at least one of polybutadiene and styrene-butadiene copolymers.

11. The method of claim 9, wherein the high impact polystyrene further comprises at least one of polybutene, olefinic synthetic oil, and mineral oil.

12. The method of claim 9, wherein the heating comprises passing the high impact polystyrene through a microwave energy field.

13. The method of claim 9, wherein the high impact polystyrene heated is initially in the form of at least one of a sheet, a pre-cut sheet, a blank, a molded blank, and a puck.

14. The method of claim 13, wherein the polystyrene heated has a thickness in the range from about 0.01 mm to about 50 cm.

15. The method of claim 13, wherein the sheet has a width of at least 51 cm (2 feet).

16. The method of claim 9, further comprising disposing the high impact polystyrene as a layer in a multi-layered composite having one or more layers non-receptive to microwave energy.

17. A method for manufacturing an article, the method comprising:
heating a high impact polystyrene volumetrically with microwave energy, wherein the high impact polystyrene comprises:
a discontinuous rubber phase; and
a continuous styrene phase comprising up to 49 weight percent of at least one of an acrylate comonomer and a vinyl cyanide comonomer; and
processing the heated high impact polystyrene to form the article.

18. The method of claim 17, wherein the processing comprises at least one of mixing, transferring, shaping, stamping, injecting, forming, molding, and extruding.

19. The method of claim 17, wherein the processing comprises thermoforming.

20. The method of claim 17, further comprising disposing the high impact polystyrene as a layer in a multi-layered composite having one or more layers non-receptive to microwave energy.

* * * * *